Nov. 6, 1956  C. WEISHEIT  2,769,612
SHOVEL WITH LIFTING MEANS
Filed Oct. 16, 1953
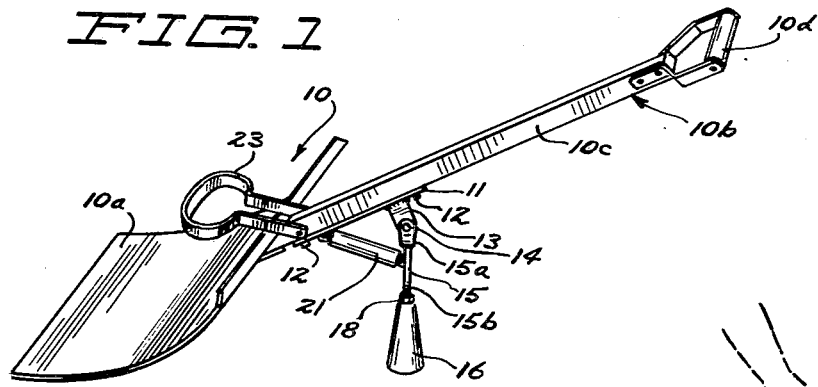
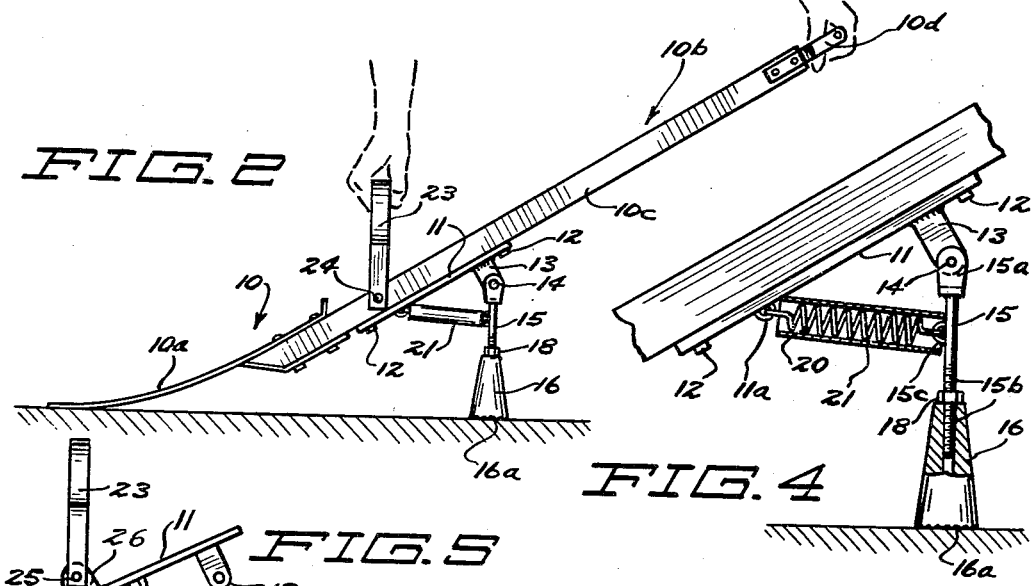
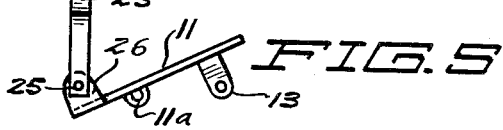
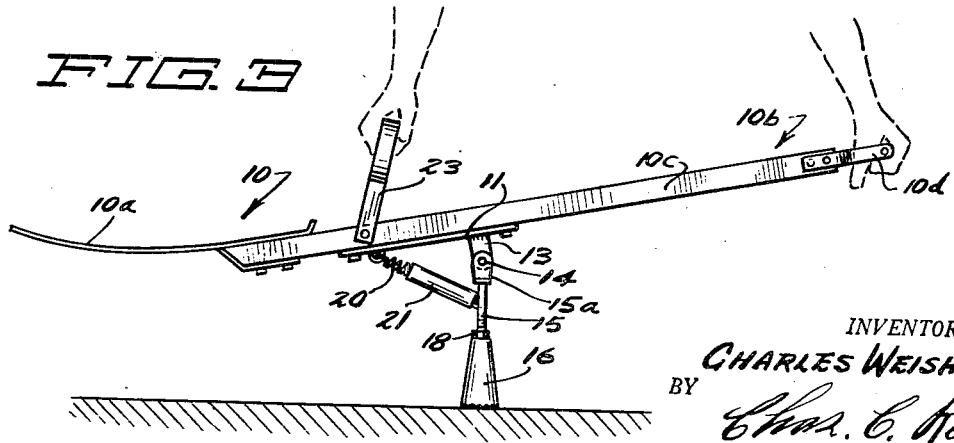
INVENTOR.
CHARLES WEISHEIT
BY
Chas. C. Reif
ATTORNEY

United States Patent Office 2,769,612
Patented Nov. 6, 1956

2,769,612

SHOVEL WITH LIFTING MEANS

Charles Weisheit, Northfield, Minn.

Application October 16, 1953, Serial No. 386,424

8 Claims. (Cl. 254—131.5)

This invention relates to a device for modifying a shovel to provide a fulcrum whereby substantial leverage can be secured in lifting a quantity of material to be shoveled, off of the ground with said shovel. The device has high utility in shoveling coal, dirt, grain, snow, etc. In shoveling snow, and especially wet snow, there is a substantial amount of suction to overcome in lifting a shovel full of snow free of the surface of the ground, and it is desirable to have some means of easily exerting a substantial amount of leverage to loosen such a quantity of snow from the ground. It is also desirable to provide a pair of spaced handles on a shovel to make it easier to lift a shovel of snow and dispose of it to one side in a swinging motion.

It is an object of this invention to provide a fulcrum for a shovel which will enable one to have a substantial amount of leverage in loosening a quantity of material and lifting the same off of the surface.

It is another object of this invention to provide a supporting member to be pivotally secured to the handle of a shovel to provide a fulcrum for exerting a substantial amount of leverage and to provide an auxiliary handle so that both hands of the operator may be used in lifting the shovel.

It is a further object of this invention to provide a supporting means to be used in connection with a shovel, said supporting means to be pivotally secured to the handle of a shovel and provide a fulcrum therefor, means for limiting the movement of said supporting means in one direction, and an auxiliary handle pivoted to said shovel so that a substantial amount of leverage can be secured in the use of the shovel and both hands of the operator may be used in lifting the shovel and disposing of the material thereon with a swinging motion.

These and other objects and advantages of the invention will be fully set forth in the following description made in connection with the accompanying drawings in which like reference characters refer to similar parts throughout the several views and in which:

Fig. 1 is a perspective view showing applicant's device in operating position;

Fig. 2 is a view in side elevation of applicant's device;

Fig. 3 is a view in side elevation similar to Fig. 2 showing the applicant's device in a different position;

Fig. 4 is an enlarged view in side elevation of applicant's device showing some parts in section; and Fig. 5 is a view in side elevation of a modification of applicant's device.

Referring to the drawings, a shovel 10 is shown. Applicant's device may be used in connection with any type of a hand operated shovel. In the embodiment of the invention here disclosed, it is shown as being used in connection with a common type of a snow shovel. The shovel 10 comprises a blade portion 10a and a handle portion 10b comprising a shank 10c and a handle portion proper 10d.

Secured to the lower end of said shank 10c is an elongated plate member 11. Said plate member 11 is secured to said shank by screws or bolts 12. Depending from the upper end portion of said plate member is a lug 13. Pivotally secured to said lug 13 by a pivot 14 in the form of a rivet is a rod 15 having a bifurcated upper end portion 15a and having a threaded lower end portion 15b. Threaded onto said rod 15 is a base member 16 having a suitable roughened bottom surface portion 16a, and here disclosed as being serrated. Said base portion is illustrated as being frusto-conical in form. A lock nut 18 is provided on said rod member 15 and engaging member 16 which will hold member 16 from becoming loosened when it is adjusted to a desired position. A resilient member, such as a spring 20, is provided, connecting member 15 and the lower end portion of plate member 11 and has one end secured to an apertured lug 11a on plate 11 and its other end connected to an apertured lug 15c secured to rod 15. Said spring 20 is here shown as a tensile coiled spring. Disposed over member 20 is a sleeve member 21. Secured to the lower end of shank 10b and adjacent blade 10a is an auxiliary bail handle 23 having portions at each side of shank 10b which are pivotally secured to said shank 10b by a pivot 24 shown as a rivet.

In operation, as in shoveling snow, the operator will lift shovel 10 by handles 10b and 23. Said shovel will then be moved along the surface to be cleared and under a quantity of snow. Rod 15 and base member 16 will be held in a substantially vertical position by member 21. Handle 10b will now be lowered and member 16 will engage said surface. The operator will then use members 15 and 16 as a fulcrum and press down upon handle 10d. The operator is thus enabled to exert a substantial amount of force or leverage with which to lift the snow on blade 10a. A substantial amount of force is needed particularly if the snow is in a wet condition so that it is quite heavy and is quite difficult to break away from the ground and from a larger mass of snow. When the shank 10c is used as a lever, there will be a tendency for the operator to press in a downward and slightly rearward direction. Member 21 acts as a stop member limiting the movement of members 15 and 16 in a direction towards the blade of a shovel so that said members will be held in an upright position. When the snow on blade 10a has been lifted off of the ground, the operator will then use both hands to grasp handles 10d and 23 and he can then quite easily dispose of the snow to one side with a swinging motion of the shovel. When blade 10a is first disposed in a mass of snow, the tendency will be for members 15 and 16 to be pushed in a direction away from the blade of a shovel. When the blade is in operating position, the operator merely has to lift the shank portion of the shovel and members 15 and 16 will be pulled into proper operating position by the action of spring member 20.

If the operator is engaged in doing light shoveling, so the use of members 15 and 16 will not be required, then said member 20 may be disconnected from lugs 11a and 15c and may be removed with member 21. Members 15 and 16 may then be pivoted upwardly and fastened to shank 10c.

A modification of applicant's device is shown in Fig. 5. The structure here shown is substantially identical with the structure shown in Figs. 1-4 and the identical parts are respectively identified by the same characters as are used in said Figs. 1-4. Upstanding lug members 26 are provided for the structure shown in Fig. 5 and said lug members are secured to the lower end of member 11 and are secured thereto in any suitable manner, as by welding. Handle 23 is pivotally secured to said upstanding lugs 26 by a pivot 25 shown as a rivet.

In operation, applicant's device, as shown in Fig. 5, is adapted to be attached to any of the common types of hand shovels in use. Said device may be attached to any shovel in any suitable manner, as by the use of screws or bolts. The use of any shovel with applicant's device attached thereto, and more specifically the use of a snow shovel with applicant's device attached thereto will result in the same operation as has been above described.

Thus it is seen that I have provided a device used in connection with a shovel which provides a fulcrum so that a substantial amount of leverage can be secured with but relatively little effort on the part of the operator and a convenient auxiliary handle is provided so that the operator may use both hands in lifting and disposing of material which is on the blade of said shovel.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A shovel having a blade portion, a shank and a handle, having in combination, a member having its upper end pivotally secured to said shank a substantial distance from said blade and having its lower portion adapted to engage a floor, pavement or other surface, a resilient member connecting said first mentioned member and said shank at a point quite close to said blade and means for limiting the movement of said first mentioned member toward said blade.

2. A shovel having a blade, a shank and a handle, having in combination, an elongated member secured along said shank, a second member pivoted to the end of said member away from said blade and depending therefrom, a resilient member connecting said second mentioned member and the other end of said first mentioned member, a third member between said second mentioned and said first mentioned members for limiting the movement of said first mentioned member toward said elongated member, and a handle member pivoted to said shank adjacent said blade for lifting said shovel.

3. An attachment for a shovel having a blade, a shank and a handle, having in combination, an elongated plate member adapted to be attached to said shank, a member pivoted to one end of said elongated member and depending therefrom, a resilient member connecting said second member and the other end of said elongated member, means carried by said resilient member for limiting the movement of said second member toward said blade, and a handle pivotally secured to said other end of said elongated member for lifting said blade.

4. An attachment for a shovel having a blade, a shank and a handle, having in combination, an elongated plate member adapted to be attached to said shank, a lug depending from the end of said elongated member away from said blade, a second member pivoted to said lug, a third member adjustably secured to said second member to engage a floor, pavement or other surface, a resilient member connecting said second member and the other end of said plate member, a member between said second mentioned member and said shank for limiting the movement of said second member in one direction, and a handle pivoted to said plate member for lifting said blade.

5. The structure set forth in claim 4, said third member being threaded onto said second member and being frusto-conical in form and having a serrated bottom surface whereby the length of said second mentioned member can be adjusted for the convenience of the operator of said shovel.

6. The structure set forth in claim 4, said last mentioned member comprising a sleeve disposed about said resilient member and extending between said second member and said plate member.

7. An attachment for a shovel having a blade, a shank and a handle having in combination, an elongated plate member adapted to be attached to said shank, a lug depending from one end of said member, a rod having its upper end pivoted to said lug, a member having its upper end threaded onto said rod and having a serrated bottom surface at its lower end, a coiled spring connecting said rod and the other end of said plate, a sleeve disposed over said spring limiting the movement of said rod toward said plate, and a handle pivoted to said plate adjacent its other end.

8. An attachment for a shovel having a blade, a shank and a handle, having in combination, an elongated plate member adapted to be secured to said shank of said shovel, a pair of spaced upstanding lugs at one end of said plate member, a lug depending from the other end of said plate member, a rod pivoted to said lug and having a threaded lower end portion, a member threaded onto said rod and having a serrated bottom surface portion, a coiled tensile spring connecting said rod and said first end portion of said plate member, a sleeve disposed about said spring limiting the movement of said rod toward said plate, and a handle pivoted to said upstanding spaced lugs for lifting said blade.

References Cited in the file of this patent

UNITED STATES PATENTS

| | | |
|---|---|---|
| 584,827 | McIndoo | June 22, 1897 |
| 2,269,119 | Mason | Jan. 6, 1942 |